(No Model.) 9 Sheets—Sheet 1.
R. DUTTON & R. EICKEMEYER.
HARVESTER.
No. 312,450. Patented Feb. 17, 1885.
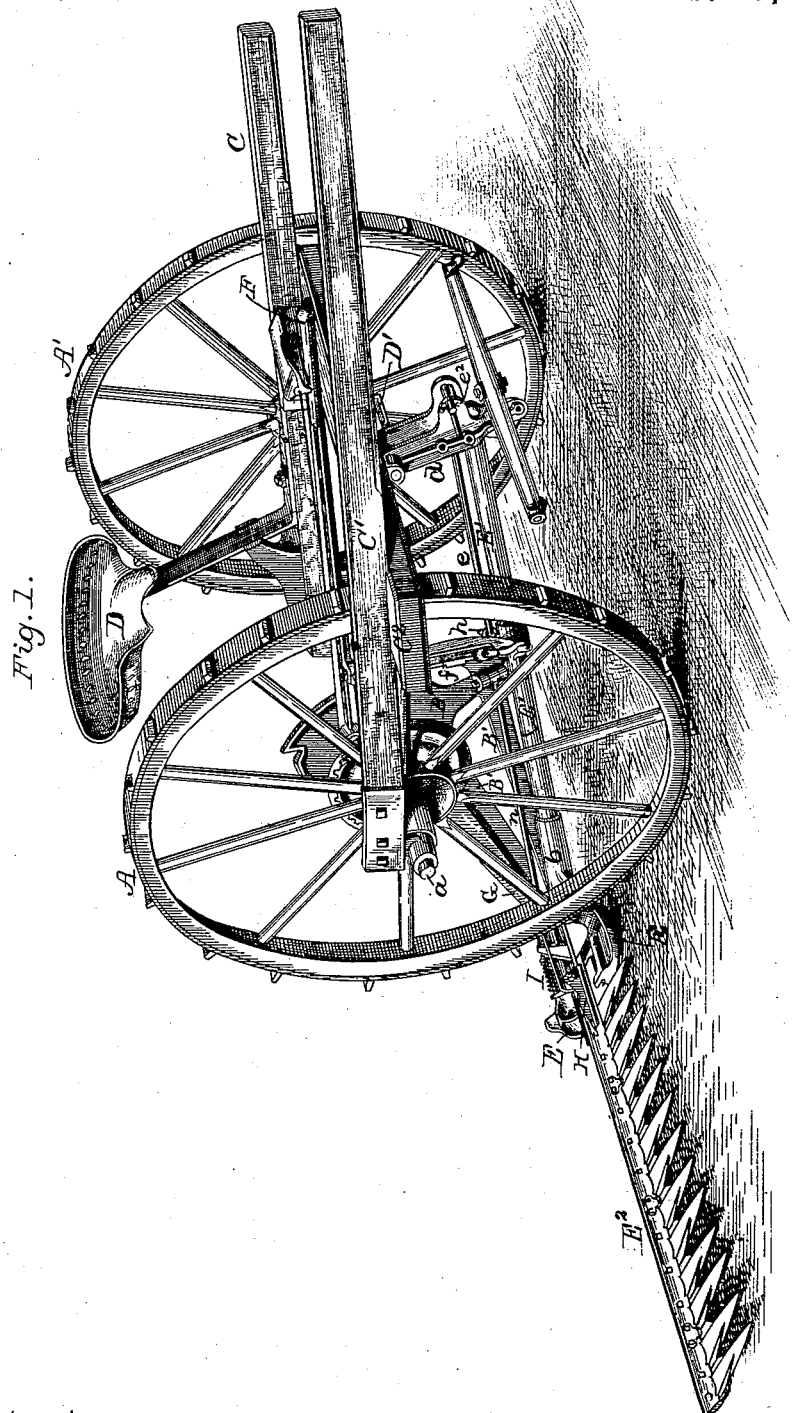

(No Model.) 9 Sheets—Sheet 2.
R. DUTTON & R. EICKEMEYER.
HARVESTER.
No. 312,450. Patented Feb. 17, 1885.
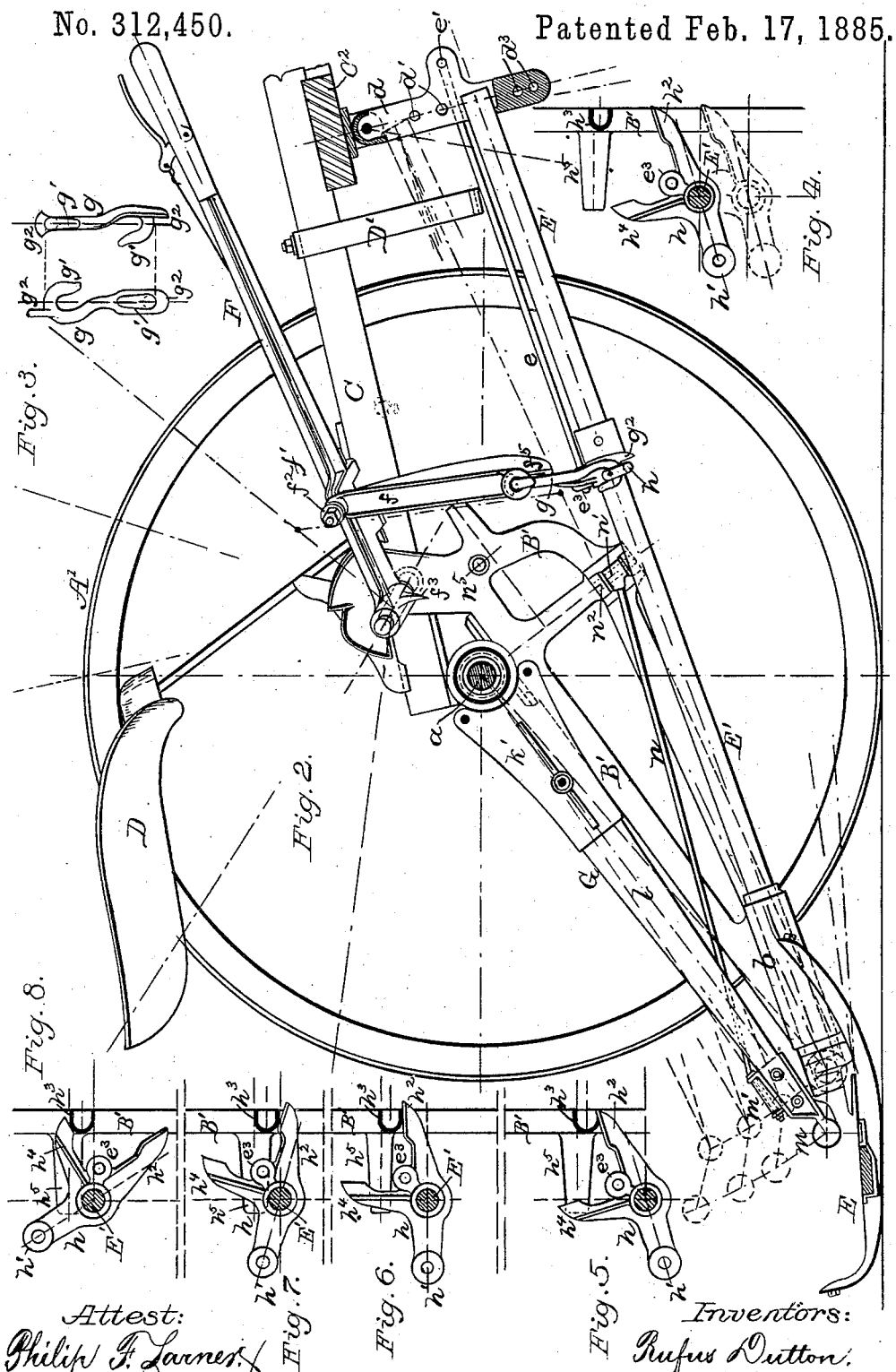
Attest:
Philip F. Larner
Howell Bartle
Inventors:
Rufus Dutton
Rudolf Eickemeyer
By Wm. C. Wood attorney.

(No Model.) 9 Sheets—Sheet 3.
R. DUTTON & R. EICKEMEYER.
HARVESTER.
No. 312,450. Patented Feb. 17, 1885.
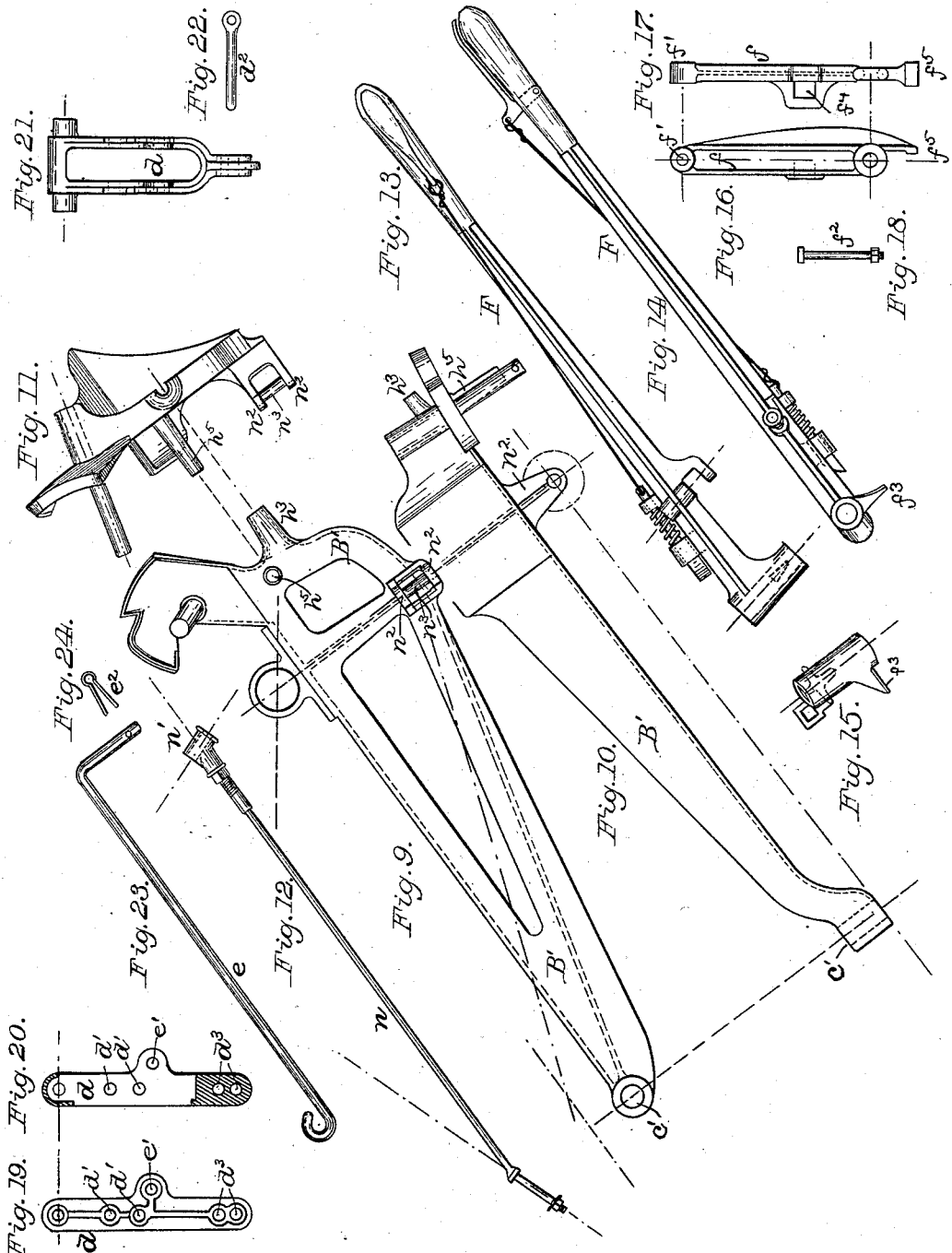

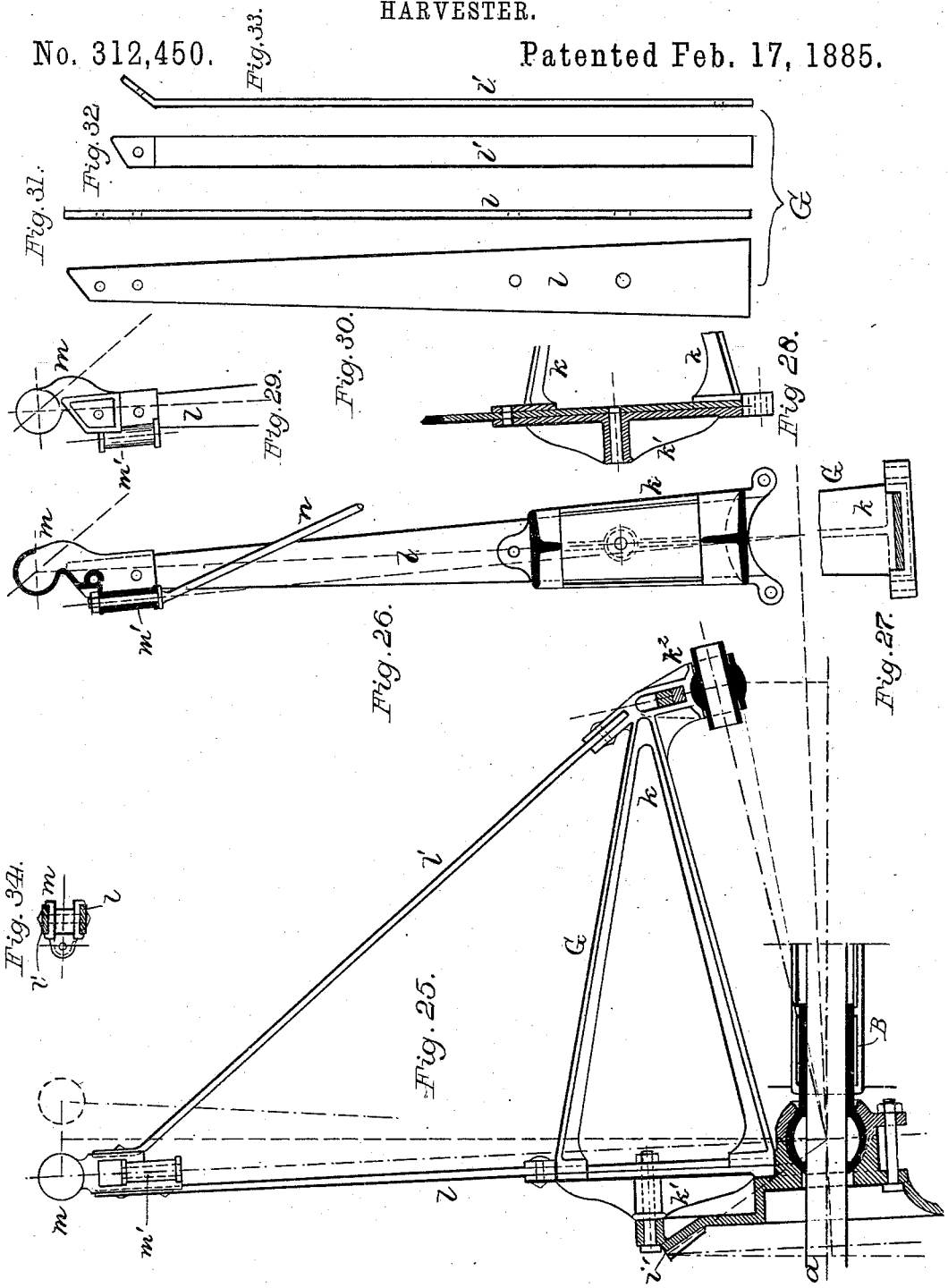

(No Model.) 9 Sheets—Sheet 5.

R. DUTTON & R. EICKEMEYER.
HARVESTER.

No. 312,450. Patented Feb. 17, 1885.

Attest:
Philip F. Larner
Howell Bartle

Inventors:
Rufus Dutton
Rudolf Eickemeyer
By Wm. O. Wood
Attorney (No Model.) R. DUTTON & R. EICKEMEYER. 9 Sheets—Sheet 8.
HARVESTER.
No. 312,450. Patented Feb. 17, 1885.
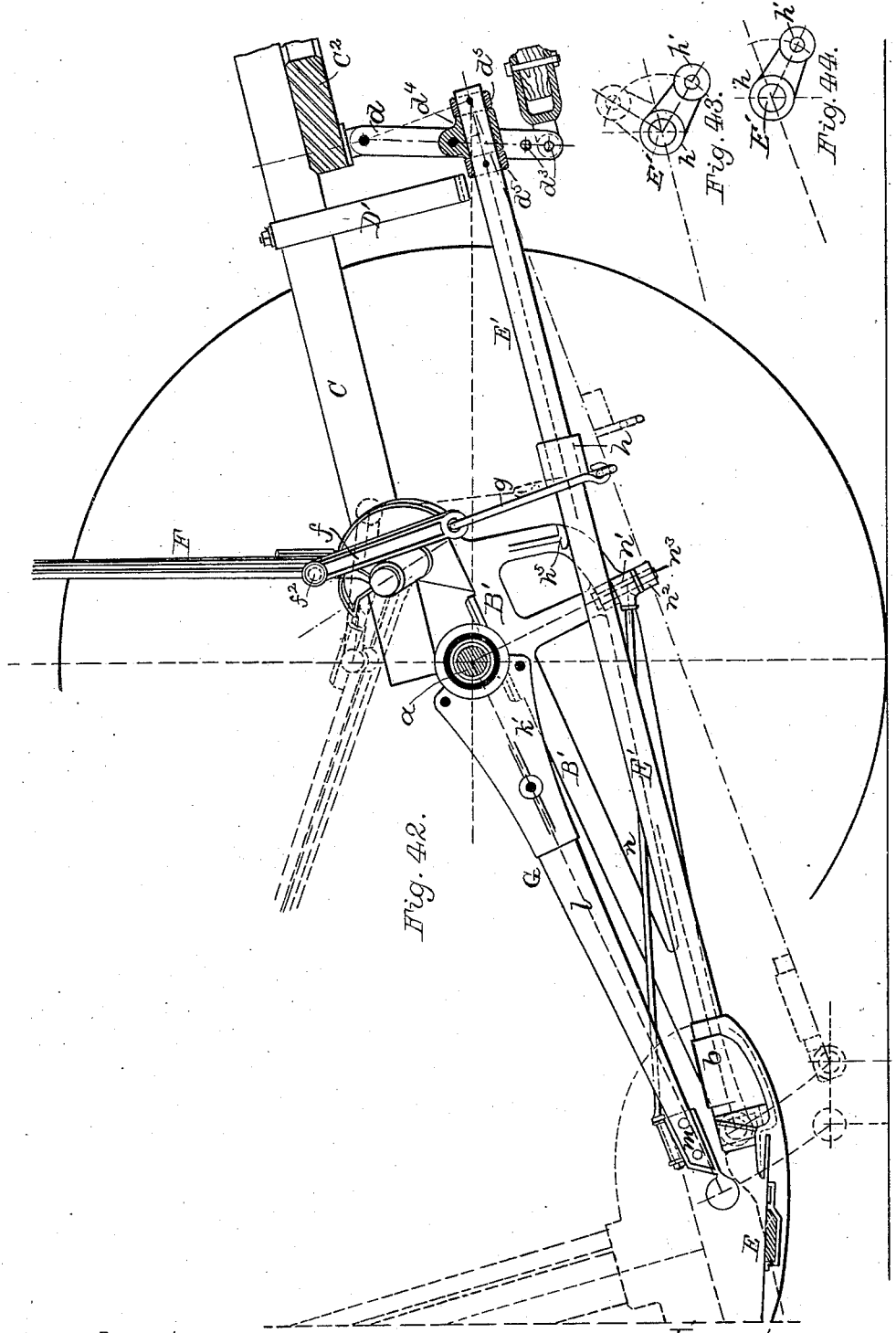

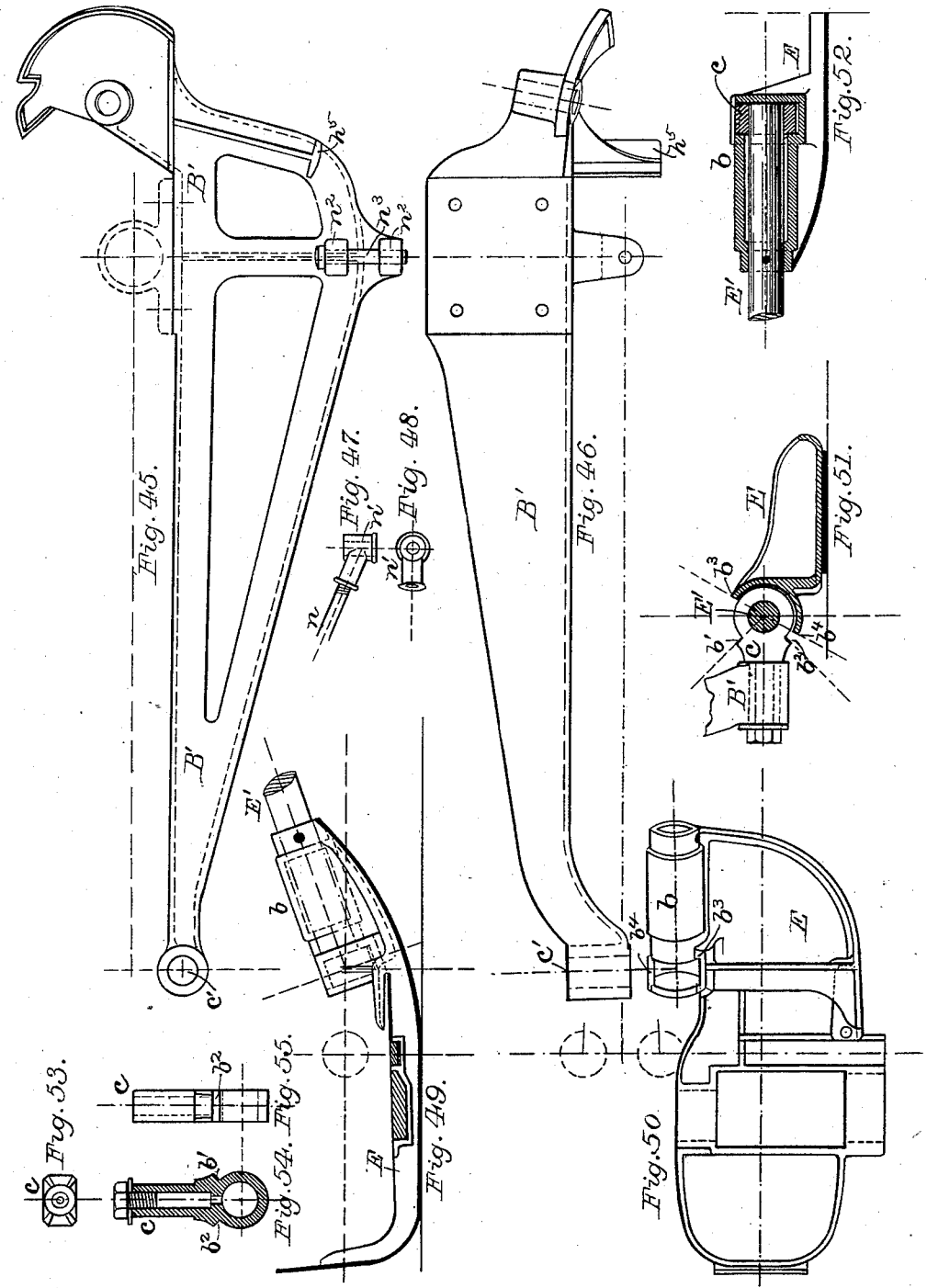

United States Patent Office.

RUFUS DUTTON AND RUDOLF EICKEMEYER, OF YONKERS, NEW YORK.

HARVESTER.

SPECIFICATION forming part of Letters Patent No. 312,450, dated February 17, 1885.

Application filed December 15, 1883. (No model.)

*To all whom it may concern:*

Be it known that we, RUFUS DUTTON and RUDOLF EICKEMEYER, both of Yonkers, in the county of Westchester and State of New York, have invented certain new and useful Improvements in Harvesters; and we do hereby declare that the following specification, taken in connection with the drawings furnished and forming a part of the same, is a clear, true, and complete description of the several features of our invention.

Our several improvements are herein shown and described as embodied by us in a rear-cut one-horse machine, in which the cutting mechanism is operated by the oscillating or rocking movement of a beveled gear, which is peculiarly engaged by a driving-gear on the axle of the machine in a manner well known; but it is to be understood that certain features of our invention are applicable to both light and heavy machines, regardless as to how the cutting mechanism is operated from the axle or driving-wheel, and whether the machines be of the front-cut or rear-cut variety.

After fully describing the machine referred to and certain obvious modifications and variations in the construction thereof, the features deemed novel will be duly specified in the several claims hereunto annexed.

Figure 40:
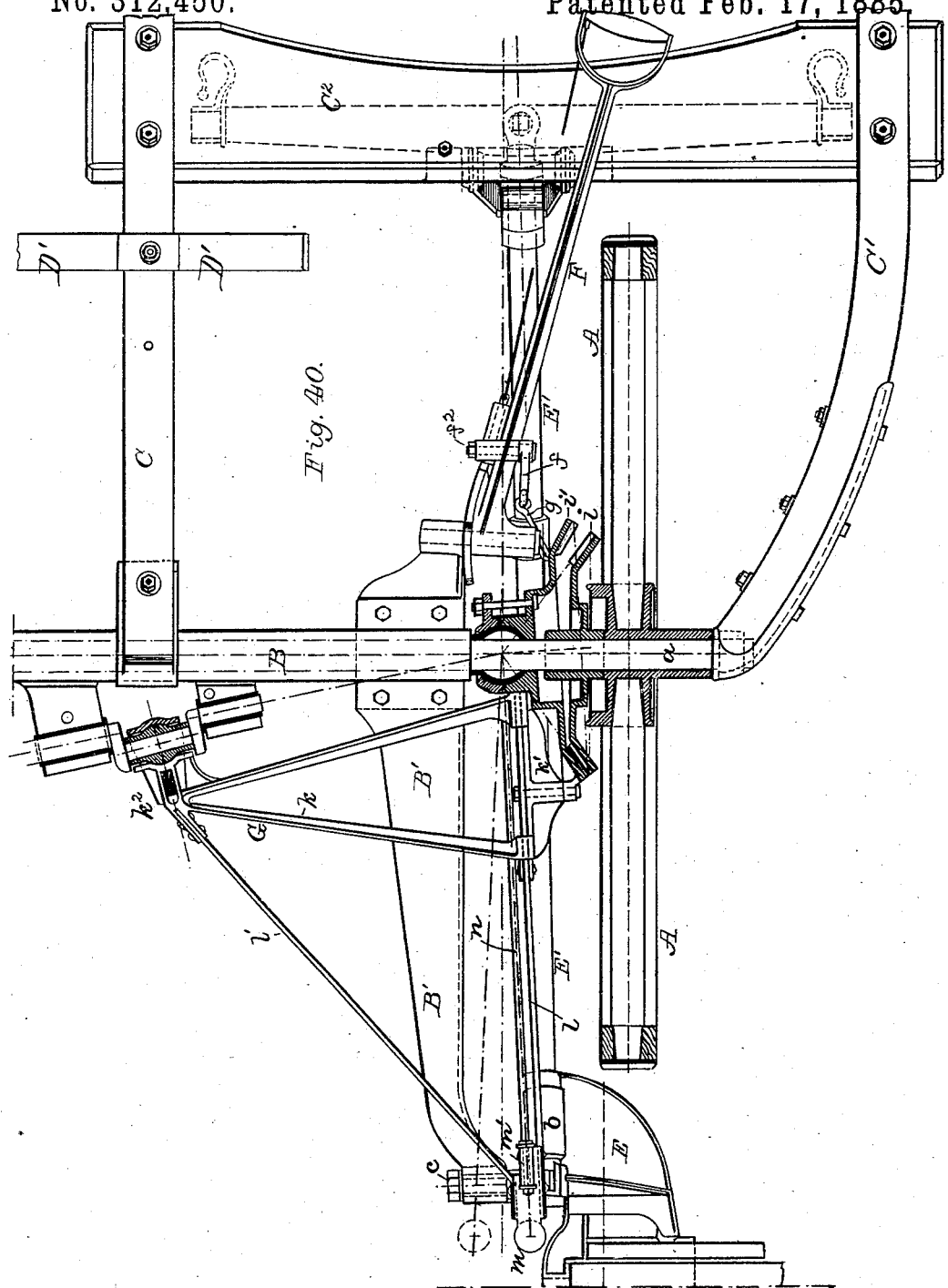
Figure 41:
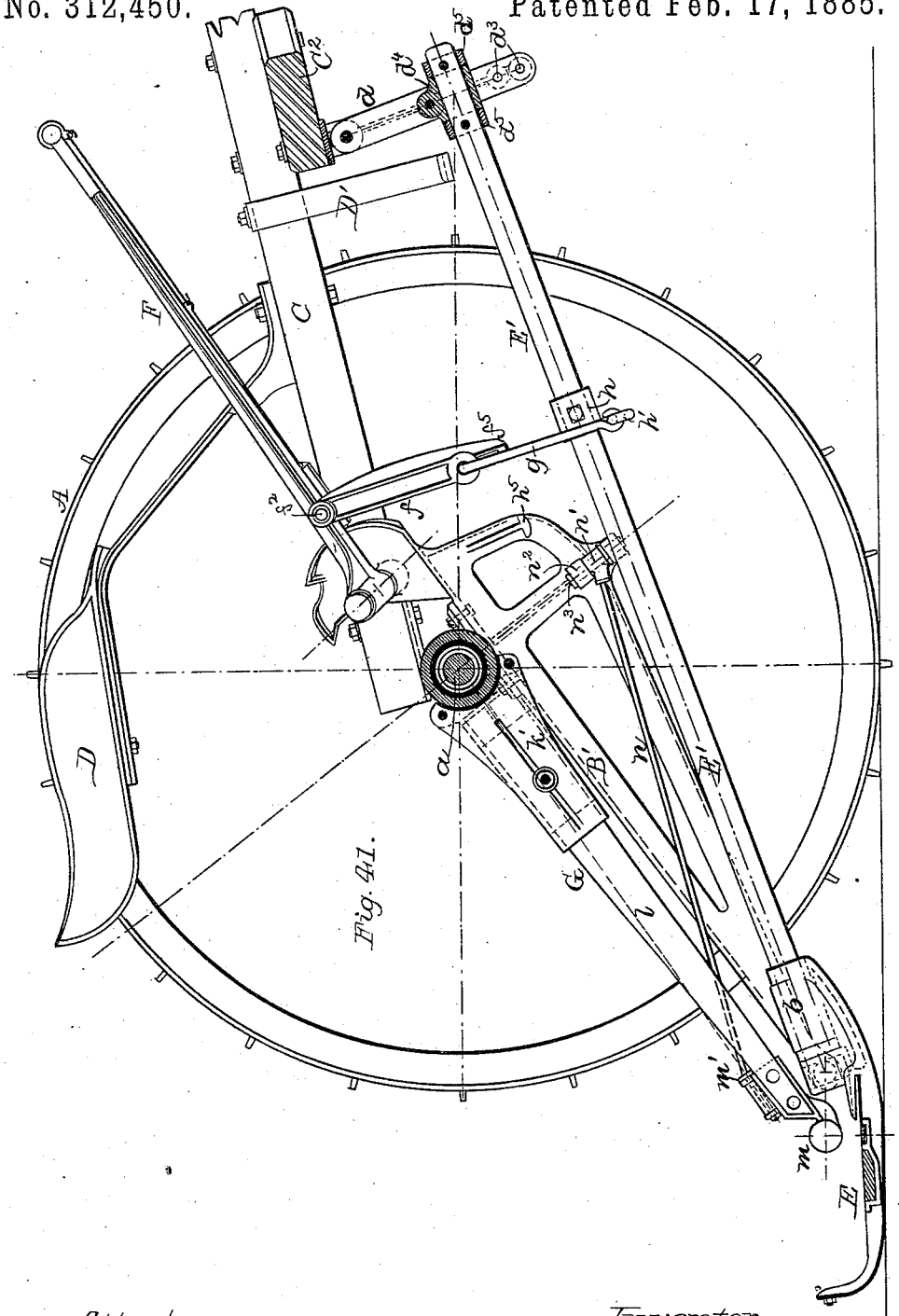

Referring to the nine sheets of drawings, Figure 1 is a perspective view of one construction of our machine embodying the several features of our invention. Fig. 2 is a longitudinal vertical section of the same on a line adjacent to the inner side of the inner drive-wheel. Figs. 3 to 8, inclusive, illustrate portions of mechanism for lifting the cutting apparatus and for rocking or tilting the same, as when varying the height of cut. Figs. 9 to 12, inclusive, are views of detached portions of the frame. Figs. 13 to 18, inclusive, are views of detached portions of the lifting and tilting mechanism. Figs. 19 to 24, inclusive, are views of detached portions of the draft mechanism intervening between the whiffletree and the cutting mechanism. Figs. 25 to 34, inclusive, are detail views of the vibrating arm or lever by which power is imparted from the oscillating or rocking gear to the knife-bar. Figs. 35 to 39 are detail views illustrating the mechanism by which the vibrating arm or lever is connected to the knife-bar. Fig. 40 is a partial top view and horizontal section of the machine shown in Fig. 1, so far modified in its construction that it has no capacity for tilting or rocking the finger-bar for varying the height of cut. Fig. 41 is a vertical longitudinal section of the machine shown in Fig. 40. Fig. 42 is a like section with certain of the parts in different position. Figs. 43 and 44 are views of a crank arm or lever embodied in the lifting mechanism of the machine shown in Figs. 40, 41, and 42. Figs. 45 to 48, inclusive, illustrate portions of the frame used in the machine shown in Fig. 41. Figs. 49 to 55, inclusive, illustrate the inner shoe and the parts by which it is connected to the frame.

As stated in the general description of the drawings, the machine shown in Fig. 1 contains all of our improvements, and it is to be understood that the modifications in construction illustrated by us are such as incidentally relate to a finger-bar which cannot be rocked or tilted on its longitudinal axis for varying the height of cut, and they include corresponding variations in the construction of the lifting mechanism.

The general construction of the frame of our machine and the arrangement of the drive-wheels are clearly illustrated in Figs. 1, 2, and 40. The inner and outer drive-wheels, A A', are, as usual, loosely mounted upon the axle *a*, and provided with the usual pawl-and-ratchet connections. (Not shown in the drawings.)

The main frame of the machine includes a sleeve, B, (within which the axle *a* is journaled,) and a rearward and downward projecting arm, B', which is firmly bolted to said sleeve. Said arm is shown in side, top, and end views in Figs. 9 to 11, inclusive, as for the machine shown in Figs. 1 and 2, and in enlarged side and top views in Figs. 45 and 46, as for the machine shown in Fig. 40. This arm, bolted to said sleeve, as described, constitutes a detachable pendent hinged frame for a rear-cut machine.

For a one-horse machine, the thills or shafts C C' are respectively hinged to the sleeve B and to the outer end of the axle, the shaft C' at its rear end being curved outward from the axle, thus locating the path of the horse as near as need be to the line of standing grass, the cut grass being properly cleared away by the usual track-board during the previous passage of the machine. The shafts or thills are braced by a cross-bar, C², which is wholly beyond and outside of the drive-wheels. The driver's seat D is mounted upon a spring fastened to the rear end of the shaft or thill C, over the center of the machine, and a foot rest or stirrup, D', is in the form of a double hook, depending from and straddling the same thill at a proper point in front of the seat. It will be seen that the seat is located so far rearward of the axle as to enable the weight of the driver to be borne by the axle, without inducing downward pressure upon the outer ends of the thills.

In our machine we have for the first time, as we believe, so connected the cutting apparatus of a rear side-cut machine with the whiffletree or double-tree, as the case may be, that the draft of the team is directly in line with and applied to the inner shoe and cutting apparatus, and also so that the draft of the team requisite for moving the machine and operating the knife-bar is applied wholly at the rear of the machine, and is then exerted in an endwise or abutting force against the lower end of the rearwardly-projecting and pendent portion B' of the frame, and therefore strains or shocks upon the cutting apparatus incident to obstacles encountered in service are not communicated to the frame, because the team pulls or draws the cutting apparatus and the latter pushes the frame and wheels, as distinguished from prior rear-cut machines, in which the team pulls or draws the frame and wheels, and said frame drags or pulls the cutting apparatus, which is connected therewith. The inner shoe, E, is connected with the finger-bar in the usual manner. It is provided at its front and inner edge with a sleeve, b, inclined upward and forward, as clearly shown in Figs. 49 and 50, and at its rear or lower end said sleeve is one-half cut away to receive the circular head of a swivel-bolt, c, which at its shank is loosely housed in a bolt-hole, c', at the rear end of the pendent frame-piece B', as clearly indicated in detail in the several figures on Sheet 9, thus providing with the shoe-rod E', next described, for a proper hinge-connection between the cutting apparatus and the pendent portion B' of the frame. The shoe-sleeve b is occupied by the shoe rod or arm E', which is keyed or pinned thereto, and extends upward and forward in a plane practically at right angles to the cutting apparatus beneath the axle to a point beneath the cross brace or bar C², which connects the thills, and at its lower or rear end it is free to rotate in the eye of the swivel-bolt c. When the shoe-rod is axially rotated, it carries the shoe with it within the limits permitted by the swivel-bolt c, which has suitable stops provided in the upper and lower abutting surfaces, b' b², with which the coincident surfaces b³ and b⁴ on the cut-away portion of the shoe-sleeve engage, as specially indicated in Fig. 51.

The cutting apparatus E², Fig. 1, includes, as usual, the inner shoe, the finger-bar rigidly connected to said shoe, and the usual knife-bar, to which the knives are riveted. The cutting apparatus and shoe-rod, thus rigidly connected as regards longitudinal strains and axially coupled to the pendent frame by the swivel-bolt, are connected with the team as follows:

In the machine shown in Figs. 1 and 2, wherein the tilting of the shoe is provided for, the front end of the shoe-rod E' must be freely raised or lowered, and therefore said rod is coupled or connected to the vertically-slotted pendent draft-link d by a flexible connection or draft-hook, e, Fig. 23, which, as shown in Fig. 2, is connected at its front end with the draft-link at the hole e', and is held in place by the spring-key e², Fig. 24, and it extends rearward for connection at its rear end with an eye, e³, on a collar or other suitable device rigidly mounted on the shoe-rod, and in this case said collar is a portion of a shoe-rod lever or arm, to be hereinafter described in connection with the lifting mechanism. The link d is shown in detail in side, sectional, and front views in Figs. 19 to 21, inclusive.

For preventing the front end of the shoe-rod E' from falling below any desired point of adjustment within the slot, the link is provided with holes d', into either of which the pin d², Fig. 22, is laterally inserted across the slot, for serving as a front support for said shoe-rod. The whiffletree is connected to the link at either of the holes d³.

In a machine in which the shoe cannot be rocked or tilted, as shown in Figs. 41 and 42, the front end of the shoe-rod E' is not vertically movable within the slot of the draft-link d, but it is axially housed in a sleeve, d⁴, having a lug which is swiveled on a pin which passes through the sides of the link, and on said shoe-rod, at each end of the sleeve d⁴, collars d⁵ are firmly secured, so that said shoe-rod is longitudinally fixed within said draft-link sleeve. The shoe-rod thus connected with the whiffletree affords a practically direct and unbroken line of draft between the cutting apparatus and the team, and the cutting apparatus while properly held down to its work is not unduly forced against the surface of the ground, so as to occasion objectionable friction therewith.

We know it is not new to provide more than one point of attachment between the whiffletree or double-tree and a draft-link; but in our machine the combination of a draft-link having two or more holes for connecting with the whiffletree and the shoe-rod rigidly connected to the cutting apparatus is of special value for graduating the pressure of the shoe upon the ground.

Our draft-link also performs a novel function, in that in both constructions of the machine shown the vertical slot or opening in said link serves as a convenient and simple means for confining the front end of the shoe-rod against lateral movements, while permitting it to rise and fall in the machine shown in Figs. 1 and 2, while in the machine shown in Figs. 41 and 42 said link also confines said front end of the shoe-rod against vertical movement.

It will be obvious that the inner shoe of any variety of rear side-cut machine may be thus connected with a draft-link, and that the pendent portion B' of the frame may be employed in connection therewith, regardless of the mechanism by which the knife-bar is operated, and it is equally obvious that the cutting apparatus of a front side-cut machine may be provided with a shoe-rod, as described, for obtaining desirable results.

We will next describe the mechanism by which the cutting apparatus is partially or wholly lifted for passing obstacles, or for folding it up when the machine is arranged for road transportation. Said lifting mechanism is slightly modified in its construction, according to whether or not provision is made for rocking the finger-bar and inner shoe. In both machines the hand-lever F is substantially the same, and is provided with the usual spring-latch and thumb-piece for tripping the latch, as indicated in detail in Figs. 13, 14, and 15. With said lever we also employ the usual inclined fulcrum-stud and a notched segment, which in our machine are both formed upon or attached to the front end of the frame-piece B', as indicated in detail in Figs. 9, 10, and 11. Our notched segment or quadrant is provided with two notches, the upper one serving to hold the cutting apparatus in a practically horizontal position, sufficiently elevated to clear low obstacles, or for shifting the position in the field, when the complete folding of the cutting apparatus is unnecessary. The lower notch, as usual, confines the cutting apparatus in its folded position.

The hand-lever F is connected to the cutting apparatus by way of the shoe-rod E' in a novel manner and by novel means.

In both constructions of the machine illustrated the hand-lever is connected to a lever or arm on the shoe-rod by a pivoted link composed of two parts, the upper one of which serves not only as a bar-link, $f$, but also as a lever auxiliary to the hand-lever; or, otherwise stated, said bar-link serves as a link and also as a prolongation of the hand-lever beyond its fulcrum, so that said hand-lever during a portion of its movement is a straight lever fulcrumed at one end thereof, and thereafter for the remainder of its movement its fulcrum is practically shifted, and it is then similar to a bell-crank lever. The lower link, $g$, has a hook at each end for respectively engaging with an eye in the lower end of the bar-link, and also with an eye in a three-armed lever, $h$, which is keyed to the shoe-rod E'.

The bar-link $f$ is shown in detail in Figs. 16 and 17, and it is pivoted to one side of the hand-lever at $f'$ by a bolt, $f^2$, Fig. 18, which passes through an eye in the upper end of the link. To render this link stiff while performing its lever function, it has a convex web on its back, and to afford a reliable fulcrum for this link when operating as a lever the sleeve-hub of the hand-lever has a projecting stud, $f^3$, Figs. 14 and 15, which occupies a mortise, $f^4$, in a laterally-projecting lug on the inner side of said bar-link, as shown in Fig. 17. The lower link, $g$, is shown in two views in Fig. 3.
It has the upper and lower hooks, $g'$ $g'$, standing at right angles to each other.

For causing the bar-link $f$ and the hook-link $g$ to normally stand in line with each other and thereby support the hand-lever F, said bar-link has at its lower end a longitudinal projection, $f^5$, and the hook-link at each end has similar projections, $g^2$; and it may be seen in Fig. 2 that these projections co-operate so as to properly hold the two hooks in the eyes respectively occupied by them, and to maintain the complex link in a vertical position when the hand-lever is in its lowest position.

The three-armed lever $h$ on the shoe-rod E' is fully shown on Sheet 2. Its outer arm, $h'$, has the eye with which the hook-link $g$ engages, and the inner arm, $h^2$, by engaging with a stop-stud, $h^3$, projecting forwardly from the front end of the pendent frame-piece B', co-operates with the hand-lever F and the jointed link in causing the gradual and easy rotation of the shoe-rod E' and a corresponding lifting or folding of the cutting apparatus. The third arm, $h^4$, acting against the stop-stud $h^3$, serves as a stop for limiting the inward rotation of the shoe-rod E', and it also serves as a lever for inducing the outward rotation of said rod when lowered, and thereby affording the initial falling movement of the cutting apparatus from its practically vertical position when folded. The eye $e^3$ on this arm or lever $h$ is the one to which the draft-hook $e$ is connected, as hereinbefore described.

Referring now to Fig. 2, it will be seen that the cutting apparatus rests upon the ground, and that the hand-lever F lies forward in its lowest position; and it is to be understood that said hand-lever has such a range of movement that it lies alongside and below the driver's seat when at its opposite extreme, with the cutting apparatus wholly lifted and folded sidewise. It will be obvious that just before the hand-lever occupies a vertical position the stud $f^3$ on the hub of the lever will occupy the mortise $f^4$ of the bar-link $f$, Fig. 17, and that as the hand-lever is then moved rearwardly said bar-link becomes, in substance, a prolongation of the hand-lever and operates during the continued movement of said hand-lever as a part thereof.
Now, referring to Fig. 4, it is to be understood that the dotted lines indicate the position of the three-armed lever when the cutting apparatus is in position for service, at the least height of cut, and that the solid lines of said figure indicate the position of said lever when the cutting apparatus has been so tilted or rocked on the longitudinal axis of the finger-bar as to work at the greatest height of cut. As the hand-lever is raised the front end of the shoe-rod is carried into contact with the under inner portion of the draft-link $d$, and the three-armed lever $h$ does not cause the rotation of the shoe-rod until the arm $h^2$ strikes the under side of the stud $h^3$ on the part B' of the frame, as indicated in Fig. 5, whereupon the shoe-rod commences to turn inwardly, as progressively indicated in Figs. 6 and 7, until finally the said arm $h^2$ falls downward, and the upper arm, $h^4$, falls over and rests upon the upper side of said stud $h^3$ on the frame-piece B'; but before the shoe-rod begins to rotate it is in contact with the under side of another stud, $h^5$, which projects laterally from said frame-piece B', to serve as a stop for limiting the upward movement of the cutting apparatus while in a practically horizontal position, and when the latch of the hand-lever is engaged with the proper notch of the segment the shoe-rod is firmly confined in place.

When in use, it is frequently desirable to only lift the cutting apparatus, so that it will be in a substantially horizontal position, and this extent of lift for ordinary obstacles can be easily obtained, said hand-lever being easily lifted; but the complete lifting of the cutting apparatus involves considerable labor, and the shifting of the fulcrum incident to the operation of the link $f$ as a lever enables the cutting apparatus to be swung in the arc of a circle from a practically horizontal to a practically vertical position, or about ninety degrees, by about one-sixth of the movement of the hand-lever, and therefore the driver can readily fold the cutting apparatus while in his seat. It is obvious that this arrangement of hand-lever and jointed link can be similarly applied to other general types of machines regardless of the particular character of the knife-operating mechanism.

When the machine is not organized for a variable height of cut, as shown, for instance, in Figs. 41 and 42, the jointed link may be more simply constructed. The bar-link $f$ is somewhat shorter than in the drawings previously described, and the hook-link $g$ is somewhat longer, and they may or may not be provided with means for keeping them in line with each other. So, also, the lever-arm $h$ on the shoe-rod E' need have but one arm, $h'$, which is engaged by the hook-link, as indicated in Figs. 41, 42, 43, and 44. When thus constructed, the cutting apparatus is lifted bodily to a practically horizontal position without any rotation of the shoe-rod; but it commences to rotate when it strikes the under side of the lateral projection or stud $h^5$ on the frame-piece B', at which time the bar-link $f$ has a fulcrum-bearing on the hub of the hand-lever, and thereafter it operates as a part of the hand-lever, as indicated by the dotted lines in Fig. 42. As shown in Fig. 41, the bar-link $f$ has the strengthening-web and the longitudinal extension at its lower end for bearing against the link $g$ below its upper hook.

As seen in Fig. 41, the cutting apparatus is in position for service, and in Fig. 42 in dotted lines as folded, and it will be seen that in both cases the draft of the team is applied to the frame and wheels by an endwise thrust upon the frame-piece B', and that when in service the draft of the team causes the cutting apparatus to sufficiently hug the ground, and therefore to properly hold the cutters to their work, but with a minimum of friction.

Although the driver's seat is located centrally on the machine, and even if it be occupied by a child, the cutting apparatus will be held down to its work, and the wheels are so high and the seat is so far removed from the finger-bar, and the stirrup-hook affords such a brace for the feet of the driver, that the dangers heretofore alleged of rear side-cut machines are practically obviated, as it would be impossible for the driver to fall or to be thrown in front of the cutting apparatus.

In view of the desirably-rapid vibrations of the knife-bar incident to the use of the rocking gear, it is important for securing economy in power, easy operation, and durability that the vibrating arm, by which power is transmitted from the rocking gear to the knife-bar, should have great strength and rigidity with as little weight as is consistent therewith, and we also deem it of consequence that said arm be so far composite in its construction as will enable the economic renewal of parts, if desired.

The vibrating arm G is shown in all the large figures, and in detail on Sheet 4, Figs. 25 to 34, inclusive. Our novel arm is skeletonized, and embodies two separate triangular trusses, so combined as to form an arm in which the distribution of material is on the lines of three triangles.

We do not broadly claim a vibrating arm embodying castings and bolts or rods arranged to form a series of triangles; but our triangular arm is novel in that it embodies one integral or jointless triangular truss, which at its base is coupled to the hub and rim of the rocking gear, and at its apex is coupled to the balance-crank, and also in that we employ thin side plates of metal, which project from said integral truss and are coupled to the ball-head, thus providing for great strength with light weight of metal and economy in construction.

Referring now to Fig. 40, it will be seen that the drive-gear $i$ and the oscillating or rocking gear $i'$, mounted on its ball-joint, is substantially as heretofore used, and they are the same as shown and described in various Letters Patent heretofore issued to us separately. In Fig. 25 the rocking gear $i'$ is partially shown in section with the double-truss vibrating arm G, attached at one of its corners or angles to the hub of the gear, and also to the periphery of said gear at a corresponding distance from said corner. The small triangular truss $k$ is constructed in one piece, and it is readily produced in cast malleable iron. Its base $k'$ is provided with a strengthening-web and a socket for a bolt, by which it is secured to the periphery of the rocking gear. At its outer end said base is convex, to fit the outside of the hub of the rocking gear, and it is provided with suitable holes for receiving bolts, by which a firm connection is made with said hub. The inner side of said base is recessed or socketed for the endwise reception of an extension base-plate, $l$, which is firmly bolted thereto, all of which is clearly illustrated in Figs. 25 to 28, inclusive. The apex of the truss $k$ is provided with a housing, $k^2$, for the usual ball-and-socket journal, which is mounted on the wrist-pin of a balance-crank shaft, which in the usual manner controls the movements of the rocking gear and the vibrating arm. Said apex is also provided with an inclined open slot for the endwise reception of the plate, rod, or bar $l'$, which constitutes one side of the vibrating arm, and this is firmly secured in said slot by a bolt, as shown. The outer or rear apex of the triangular arm is composed of the ball-head $m$, which has flat recessed sides for the reception of the outer or rear ends of the plates or rods $l$ and $l'$, between which it is tightly clamped by suitable bolts, as clearly indicated in Figs. 25, 26, 29, and 34. The plate-rod $l$ is shown in side and edge views in Figs. 30 and 31, and the plate-rod $l'$ is similarly shown in Figs. 32 and 33.

It will be obvious that with the truss $k$ composed of malleable iron and the plates $l$ and $l'$ composed of rolled steel the arm can be made very light and comparatively inexpensive, and yet possess extraordinary strength, because all the parts co-operate to successfully resist the strains to which it is subjected in service. In machines having the rocking gear, the vibrating arms, as heretofore constructed, have been the source of much trouble from breakage, except when composed of such a quantity and weight of metal as would necessarily impair the operation of the machines, and our arm is of value in heavy machines as well as in light, and in front-cut as well as in rear-cut machines. The action of the driving-gear upon the rocking gear is such as would cause the latter to rotate on its axis if not properly confined, and heretofore this has been accomplished in various ways—as, for instance, by means of a rod having ball-and-socket joints at each end, and extending from the under side of the vibrating arm near its outer end to the pendent frame beneath the axle. We obviate such expensive ball-and-socket joints, and obtain a better bracing effect by means of a bent bolt peculiarly hinged to the pendent frame and to the top of the arm at its outer end.

It will be seen that we have now provided on the head $m$ an inclined bolt-housing, $m'$, for the reception of the outer end of a bent brace-rod, $n$, (shown in detail in Fig. 12,) which has at its other or inner end an eye, $n'$, located between eye-lugs $n^2$ on the pendent portion $B'$ of the frame, and it is pivotally secured thereto by means of the bolt $n^3$. The rod $n$ serves really as a swiveled part of the frame, and its outer bearing in the housing being in a line radial to the center of the ball-joint of the rocking gear, and the bolt $n^3$ being also radial thereto, but substantially at right angles to the line of said rod-housing, it is obvious that free vibratory movement of the arm is permitted by said brace-rod, while firmly controlling the rocking gear against rotation. This swiveled brace-rod may obviously be employed on front-cut machines. The ball of the ball-head $m$ is coupled to the ball $o$ on the knife-bar head H by means of a ball-socket link or pitman, I. (Illustrated on Sheet 5.) The link or pitman I is composed in part of a strap, $p$, internally provided at each end with one-half of a suitable bearing for a ball, and with two sliding bearing-blocks, $p'\ p^2$, each affording one-half of a ball-bearing, and having inclined or inner ends. Between said blocks is an interposed wedge block or key, $p^3$, which, by contact with the coincident inclined ends of the sliding bearing-blocks, serves as a gib for forcing said blocks into close contact with their balls, and thereby compensating for wear. The adjacent ends of the sliding bearing-blocks are grooved to receive the edges of the wedge-block, and the strap is also internally grooved to afford longitudinal guideways for said bearing-blocks, all as clearly shown on Sheet 5. The wedge-block or gib $p^3$ is provided with a slot, $p^4$, through its apex or upper end, and the upper surface or top of said slot is inclined, and the strap $p$ on its top is flat and straight, to afford a bearing for the under or straight side of an adjusting-wedge, $q$, which so occupies the slot $p^4$ as to force the wedge-block $p^3$ upward, and thereby cause the sliding bearing-blocks to properly engage with their respective balls. The wedge-block is rendered self-adjusting by providing it with a tail-piece, $q'$, fitted to slide in an eye-lug, $q^2$, on the strap, and an expansive spiral spring, $q^3$, which abuts at one end against a collar or cross-pin in the tail-piece, and at the opposite end against one side of the eye-lug $q^2$. With this construction the adjusting-wedge advances gradually, according to requirements, and it always properly confines all the parts in proper working positions.

Figure 35:
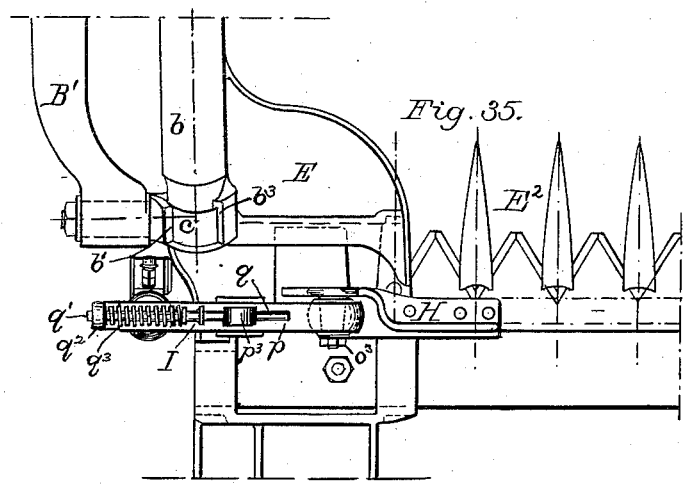
Figure 36:
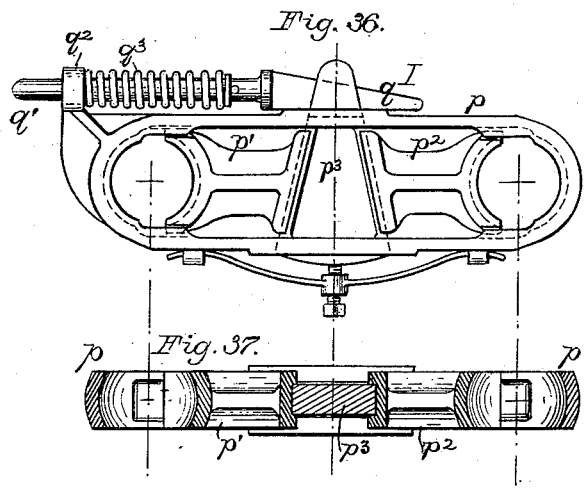
Figure 37:
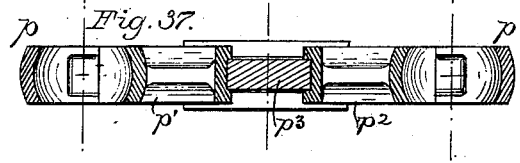
Figure 38:
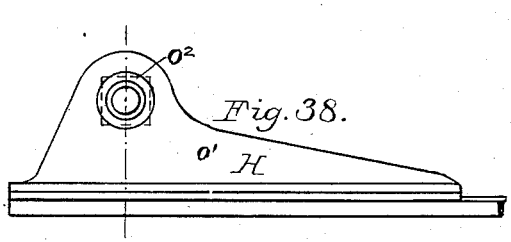
Figure 39:
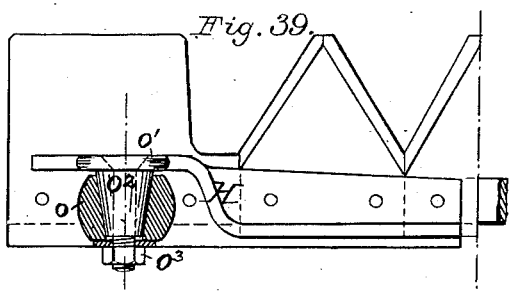

For removing the link from either ball, or both, the adjusting-wedge can be withdrawn sufficiently to wholly release the wedge-block; but the detachment of said link from the knife-bar head is a matter of frequent occurrence, which is facilitated by the construction and arrangement of the knife-head H and the ball $o$ thereon, as clearly illustrated in Figs. 37, 38, and 39, Sheet 5. The knife-bar head or knife-head H has a vertical web, $o'$, provided with a laterally-projecting conical hollow stud, $o^2$, on which the ball $o$ is mounted, it being conically chambered to fit said stud, as shown, so that when the ball is placed thereon it may be tightly confined by means of the threaded outer end of a bolt passing through said stud, and a clamp-nut, $o^3$, and by removing the latter at any time the ball can be readily detached from the knife-head, and retained in position within the link or pitman.

As one result of our improvements, strong and effective one-horse machines have been produced, of a weight of less than four hundred pounds, and they will perform all ordinary service with the driver dismounted, thus indicating their easy operation and light draft.

It is believed by us the draft-link $d$, when coupled, as shown, to the cutting apparatus, operates somewhat as a lever for enabling the draft of the team to oppose the lifting tendency of the gearing and to hold the cutting apparatus down to its proper position, because the point of connection of said link with the cutting apparatus is the fulcrum of said link-lever, and the latter is connected at its lower end with the team and at its upper end to the cross-bar $C^2$, and therefore a more or less downward pressure is exerted upon said cross-bar, and thence exerted rearwardly to the framing and axle of the machine.

We have not shown the means for throwing the rocking gear out of contact with the drive-gear, as any of the methods described in our prior patents will answer the purpose.

Having thus described our invention, we claim as new and desire to secure by Letters Patent—

1. In a two-wheeled harvester, the combination, substantially as hereinbefore described, of a suitable frame, a cutting apparatus, and a rod or bar rigidly connected to the cutting apparatus at its inner shoe, and projecting upward therefrom beneath the axle and between the wheels of the machine, as set forth.

2. The combination, substantially as hereinbefore described, of a rear side-cut mowing-machine frame, a draft-link, the cutting apparatus, and a rod or bar rigidly connected to said cutting apparatus at its inner shoe, projecting forward and upward to the draft-link and coupled thereto, as set forth.

3. In a two-wheeled harvester, the combination, with rear side-cutting apparatus, of the lifting mechanism embodying the rotative bar rigidly connected to the inner shoe and projecting forward and upward between the wheels and beneath the axle of the machine, and a hand-lever coupled to said rotative rod and located in front of the driver's seat, substantially as described.

4. In a two-wheeled harvester, the combination, substantially as hereinbefore described, of the cutting apparatus and the rotative bar or rod extending forward and upward beneath the axle and between the wheels of the machine and rigidly connected to the cutting apparatus, as set forth.

5. In a two-wheeled harvester, the combination, substantially as hereinbefore described, of the cutting apparatus, the rotative rod or bar rigidly connected thereto and extending beneath the axle and between the wheels of the machine, and a hand-lever coupled to said rod for first lifting it and then rotating it, whereby the cutting apparatus is first lifted bodily and then folded, as set forth.

6. In a two-wheeled harvester, the combination, substantially as hereinbefore described, of the cutting apparatus, the bar or rod rigidly connected thereto at its inner shoe, and projecting upward therefrom beneath the axle and between the wheels of the machine, and means for vertically adjusting the opposite or upper end of said rod or bar, for varying the height of cut, as set forth.

7. The combination, substantially as hereinbefore described, of a rear side-cut mowing-machine frame, the pendent draft-link having one or more holes for coupling with a whiffle-tree, the cutting apparatus, and the rod or bar rigidly connected to said cutting apparatus at its inner shoe, projecting forward and upward to the draft-link and coupled thereto, as set forth, whereby the draft of the team is applied in a direct line from the pendent link to the inner shoe.

8. The combination, substantially as hereinbefore described, of a rear side-cut mowing-machine frame, the vertically-slotted pendent draft-link, the cutting apparatus, and a rod or bar rigidly connected to said cutting apparatus at its inner shoe, projecting forward and upward into the slot of the draft-link and coupled thereto, as set forth, whereby the front end of said rod or bar is limited in its movements.

9. The combination, substantially as hereinbefore described, of a rear side-cut mowing-machine frame, the vertically-slotted pendent draft-link, the cutting apparatus with its rod or bar rigidly connected thereto and projecting forward and upward into the slot of said link, and a draft-hook extending from said link rearward along said rod and coupled thereto, as set forth, whereby the forward end of said rod can be freely raised or lowered, as set forth, for varying the height of cut.

10. The combination, with the cutting apparatus, of lifting mechanism, substantially as described, adapted to first rock the cutting apparatus on its longitudinal axis, then lift it vertically while it maintains a practically horizontal position, and then fold it up sidewise, as set forth.

11. The combination, with the shoe-rod located beneath the axle and between the wheels of the machine and rigidly connected to the cutting apparatus, and free to be lifted at its outer or forward end, of an adjustable support for said outer end for limiting the height of cut, substantially as described.

12. The combination, substantially as hereinbefore described, of the cutting apparatus, the rotative rod or bar located beneath the axle and between the wheels of the machine, and rigidly connected to the inner shoe, and vertically adjustable at its outer or forward end, and a hand-lever connected to said rod for lifting its outer end and varying the height of cut, and also for lifting and folding the cutting apparatus, as set forth.

13. In a harvester, the combination, substantially as hereinbefore described, of the cutting apparatus, the shoe-rod, the hand-lever for lifting the cutting apparatus, the jointed link pivoted to said lever and to said shoe-rod, and the fulcrum for said link at the end of said lever, said link adapted to operate as a mere link during a portion of the movement of said lever, and then during further movement to operate as a lever by engagement with its fulcrum at the end of the hand-lever, and thereby practically elongate said hand-lever beyond its fulcrum.

14. In a harvester, the combination of the hand-lever for lifting the cutting apparatus, the complex link, embodying a bar-link serving in part as a link and in part as a prolongation of the hand-lever, and a segment or quadrant notched to confine said hand-lever when said link operates as a link, and also when a part of said link serves as a lever, substantially as described.

15. The combination, with the pendent portion B', of the frame, the cutting apparatus hinged thereto, the shoe rod or bar, and the stop $n^5$ on said frame, which limits the upward movement of the cutting apparatus while in a practically horizontal position, substantially as described.

16. The combination of the cutting apparatus and its rotative shoe-rod rigidly connected thereto, the hand-lever and the lever or arm on said rod linked to said hand-lever, a stop for limiting the upward movement of said rod, and a second stop for engaging with the lever or arm on said rod, and thereby causing the latter to gradually rotate inwardly during its rising motion, substantially as described.

17. The combination of the cutting apparatus and its rotative shoe-rod rigidly connected thereto, the hand-lever, and the lever or arm on said rod linked to said hand-lever, a stop for limiting the upward movement of said rod, and a second stop for engaging with the lever or arm on said rod, and thereby limiting its inward rotation, substantially as described, when the cutting apparatus is in a folded position, and also for inducing the initial outward rotation of said rod when lowered to drop the cutting apparatus from its folded to its working position, as set forth.

18. The combination of the rocking gear, the vibrating arm, the pendent portion of the frame, and the bent swiveled rod $n$, hinged at its inner end to the frame upon a pivot-bolt, and at its outer end swiveled within a cylindrical housing on top of said arm in a line at right angles to the hub of said pivot-bolt, substantially as and for the purpose described.

19. The combination, with the cutting apparatus, rocking gear, and balance-crank, of a vibrating arm embodying the integral or jointless triangular truss $k$, connected at its base to the hub and the periphery of the rocking gear, and connected at its apex to the balance-crank, substantially as described.

20. The combination, with the cutting apparatus, rocking gear, and balance-crank, of a vibrating arm consisting of the integral or jointless triangular truss connecting the rocking gear with the balance-crank, and a second triangular truss provided with a ball-head for connection with the cutting mechanism, substantially as described.

21. The combination, with the rocking gear and balance-crank, of the skeletonized vibrating arm embodying the integral truss, coupled to the hub of the gear and also to the balance-crank, and the second truss composed of said integral truss and the side plates projecting therefrom, and the ball-head to which they are bolted, substantially as described.

22. The combination, with the shoe-rod and shafts or thills hinged to the machine, as described, of the cross-brace connecting said shafts, and a link suspended from said cross-brace, serving the double purpose of a draft-link and a support for said shoe-rod, substantially as described.

23. The combination, with the shaft or thills, axle, frame, and wheels, of the pendent draft-link having one or more holes for whiffletree-connections at its lower end, and the cutting apparatus coupled to said link above said whiffletree-connection, substantially as described, whereby said link is fulcrumed at its point of coupling with the cutting apparatus, and made to operate as a lever for enabling the draft of the team to oppose the lifting tendency of the cutting apparatus when in service, as set forth.

24. The combination, with the shaft or thills hinged to the frame-sleeve, of the driver's seat mounted thereon and located centrally on the machine rearward of the axle, and the foot-stirrups, also mounted on said thill or shaft, substantially as described.

25. The detachable pendent frame-piece provided at its lower end with a hinge-connection for union with the inner shoe of the cutting apparatus, and provided with the stop-studs and the stud for mounting the lifting-lever, substantially as described.

RUFUS DUTTON.
RUDOLF EICKEMEYER.

Witnesses:
HARVEY OSTERHELD,
GEORGE NARR.